3,335,361
VOLTAGE PROTECTED REGULATOR

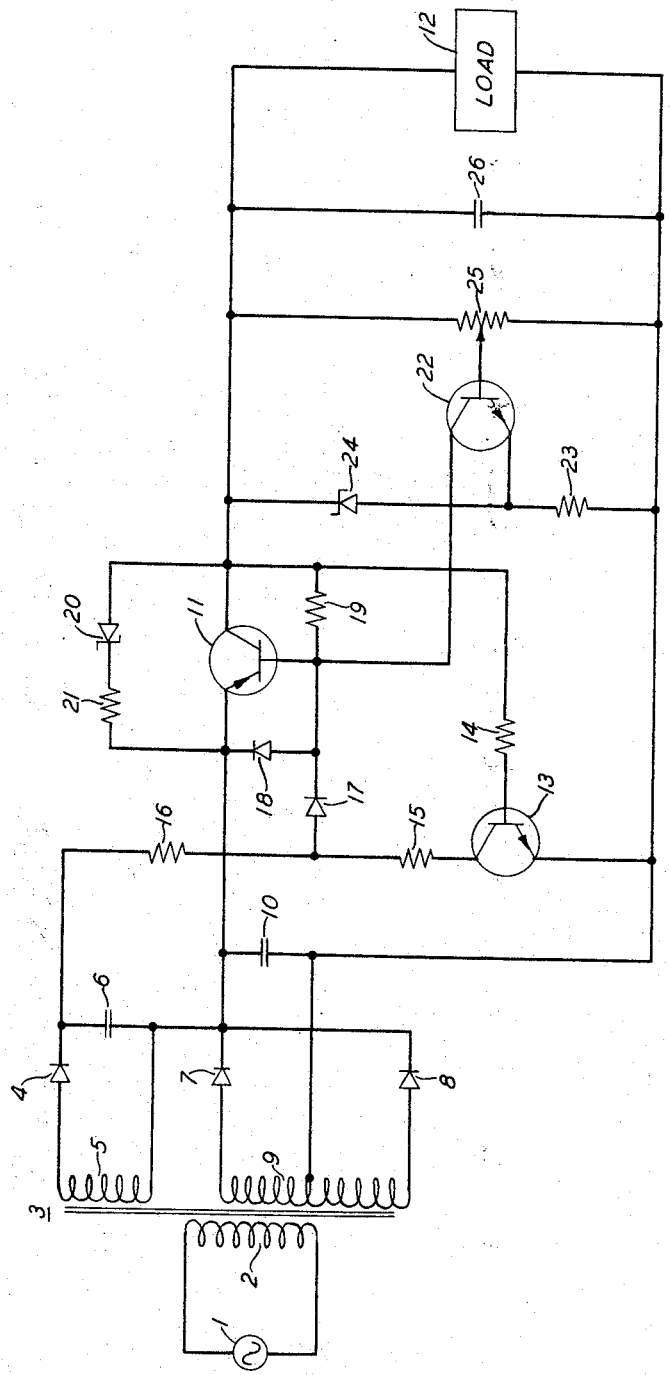

Stephen V. Natale, New Providence, N.J., and Richard M. Rickert, Indianapolis, Ind., assignors to Bell Telephone Laboratories, Incorporated, New York, N.Y., a corporation of New York
Filed June 23, 1964, Ser. No. 377,343
4 Claims. (Cl. 323—22)

This invention relates to voltage protected transistor regulator circuits and, more particularly, to unfused transistor regulator circuits wherein undervoltage protection is automatically supplied without the need for manual attendance.

In regulator circuits an undervoltage condition exists when the load voltage drops to a negligible value as, for example, due to a load short circuit. To protect the regulating transistor during such undervoltage conditions the regulators of the prior art employ various and complex circuit modifications. These undervoltage protection modifications range from electromechanical circuitry employing relays to disconnect the unfused regulator from the source to electronic circuitry that protects the regulating transistor for a period of time greater than the inherent time delay of a fuse. Each of the circuits in this range of modifications, however, requires some form of manual attendance such as, again using the extremes for an example, would be required either to reset the relay or replace the fuse.

At remote unattended stations the manual attendance requirement necessitates the expense of sending a maintenance man to the location of the regulator and, additionally, also requires that standby equipment be provided to supply the load in the interim period after the undervoltage condition has terminated but before the regulator can be manually reset or restarted. The protection problem is thus twofold; the regulating transistor must be initially protected during the undervoltage condition and then, after the undervoltage condition is terminated, the regulator must be manually restarted.

Undervoltage protection is necessary in regulator circuits because of the thermal runaway characteristic exhibited by the regulating transistor during an undervoltage condition. Thermal runaway is the term used to describe the self-destruction of a transistor wherein the increase of temperature generated transistor base drive, commonly referred to as $I_{cbo}$, has caused the collector current to increase to a value such that the maximum power dissipation ratings of the transistor are exceeded. Increased $I_{cbo}$ is usually due to an increase in the collector-base junction temperature which, in turn, may either be due to higher environment temperatures or increased emitter-collector power dissipation caused by an undervoltage condition. Since the increase in $I_{cbo}$ will cause the junction temperature to rise still further, more $I_{cbo}$ will flow to increase the junction temperature yet higher, with this regenerative process continuing until the collector current reaches a magnitude such that the maximum power ratings of the transistor are exceeded and the transistor destroys itself.

The prior art has attempted to supply a reverse base current to counteract the above-noted effects of the $I_{cbo}$ but these circuits, because the counteracting current is continuously applied, have been difficult to start and exhibit a relatively low degree of regulation. Modifications of this reverse current method were thought to require schemes that necessitated manual attendance, the disadvantages of which have been discussed in detail heretofore.

The object of this invention is, therefore, to provide automatic undervoltage protection, which does not require manual attendance, to a transistor regulator circuit.

In accordance with a feature of this invention, a protection circuit comprising a normally conductive transistor and a normally nonconductive diode is added to the regulator circuit to provide a reverse base drive to automatically protect the regulator for the duration of an undervoltage condition. In the event of an undervoltage condition, the transistor is biased or switched out of conduction and in turn causes the diode to switch to the conductive condition to both supply a reverse base drive to the regulating transistor to counteract the effects of the $I_{cbo}$ and to apply a reverse bias to the regulating transistor. The regulating transistor is thereby automatically protected for the duration of the undervoltage condition. Once the undervoltage condition is terminated, the transistor again conducts, the diode becomes nonconductive, and the reverse bias and base drive are removed so that normal operation may be resumed. Since the reverse bias and base drive are automatically removed, the circuit restarts automatically without the need for manual attendance.

Other objects and features of the present invention will become apparent upon consideration of the following detailed description when taken in connection with the accompanying drawing in which the single figure is a schematic diagram of an embodiment of the invention.

As can be seen from the drawing, an input alternating-current source 1 is connected across the primary winding 2 of transformer 3. Diode 4 is serially connected in the forward conductivity direction from one terminal of winding 5 of transformer 3 to filter capacitor 6. The anode electrodes of diodes 7 and 8 are connected to the end terminals of winding 9 of transformer 3 to form a full-wave rectifier, with the cathode electrodes of the diodes connected to form one output terminal while the center-tap terminal of winding 9 forms the other output terminal. The common terminal of winding 5 and capacitor 6 is connected to the diode output terminal of the full-wave rectifier. Filter capacitor 10 is connected across the output terminals of the full-wave rectifier. The emitter-collector path of a p-n-p regulating transistor 11 is serially connected from the diode output terminal of the full-wave rectifier to the load 12 and the center-tap terminal of the rectifier. The base-emitter path of an n-p-n protection transistor 13 is serially connected with resistor 14 across the load 12. Resistors 15 and 16 and the collector-emitter path of transistor 13 are serially connected from the cathode terminal of diode 4 to the center-tap terminal of the full-wave rectifier. Diode 17 is connected in the forward conductivity direction from the common terminal of resistors 15 and 16 to the base electrode of regulating transistor 11. Diode 18 is connected in the forward conductivity direction from the base electrode to the emitter electrode of transistor 11. Resistor 19 is connected across the base-collector path of transistor 11. Zener diode 20 is serially connected in the zener direction with resistor 21 from the emitter to the collector electrodes of transistor 11. The base electrode of transistor 11 is also serially connected with the collector-emitter path of an error-detecting transistor 22 and resistor 23 to the center-tap terminal of the full-wave rectifier. Zener diode 24 is connected in the zener direction from the collector electrode of transistor 11 to the emitter electrode of error-detecting transistor 22. Potentiometer 25 is connected across the load 12. The wiper arm of potentiometer 25 is connected to the base electrode of transistor 22. Filter capacitor 26 is connected across the load 12.

Since the operation of regulators employing the emitter-collector path of a series transistor as a variable impedance under control of load voltage variations is well known, only a short sketch of the manner in which transistors 11 and 22 achieve voltage regulation is noted here. Briefly, a change of voltage appearing across the load 12 will also appear across the potentiometer 25 which is connected in parallel with the load. Since the reference voltage developed by zener diode 24, which is continually conducting in the inverse or zener direction, is constant, the voltage change appearing across the top portion of potentiometer 25 will cause more or less bias across the base-emitter path of error-detecting transistor 22 depending upon whether the load voltage increases or decreases. A change in the base-emitter bias of transistor 22 causes a corresponding change in the collector-emitter current flow through this transistor which, in turn, controls the emitter-base current flow, and hence the emitter-collector impedance, of regulating transistor 11. The impedance of regulating transistor 11 will thus increase for an increase in load voltage and similarly decrease for a decrease of load voltage.

The operation of the protection network comprising diode 17 and transistor 13, both of which operate in the switching mode, can best be understood by noting that protection transistor 13, will normally be conductive, and in fact saturated, because of the voltage appearing across the load 12. Resistor 14, in addition to providing a current limiting function, also acts as a voltage divider with the base-emitter junction of transistor 13 and hence determines the value of load voltage at which the voltage across the base-emitter path will be less than the base-emitter threshold voltage of transistor 13 so that conduction through this transistor will be terminated. Resistors 15 and 16 are proportioned so that, when transistor 13 is conducting, the voltage appearing between the anode and cathode electrodes of diode 17 is less than the forward threshold value of diode 17 which therefore remains nonconductive. Diode 17 thus serves to block the application of the reverse bias appearing across capacitor 6 to the base electrode of regulating transistor 11 whenever protection transistor 13 is conducting. Diode 18, which is normally nonconductive, limits the inverse base-emitter voltage appearing across transistor 11 to the forward voltage drop of the diode and thereby protects the base-emitter path of transistor 11 from high inverse voltages. Resistor 19 provides supplemental collector bias for transistor 11, as discussed in detail hereinafter. The manner in which transistor 13 and diode 17 function to protect the regulating transistor is also discussed in detail hereinafter.

The foregoing discussion assumed that the circuit was started and in the normal regulatory mode of operation. Actually, additional circuitry is provided to insure that the circuit will start so that the normal mode may be reached. The need for starting circuitry is easily seen once it is noted that there is no load voltage until regulating transistor 11 is biased into conduction by error-detecting transistor 22 and that conduction through this latter transistor will not occur until there is sufficient load voltage to cause base current to flow in this transistor. To provide a load voltage so that the regulator may start, a starting zener diode 20 is serially connected with resistor 21 across the emitter-collector path of the regulating transistor 11, and a large resistor 19, which is connected across the base-collector path of the regulating transistor 11, are provided. In the present circuit, once the input voltage is applied, zener diode 20 breaks down and establishes a load voltage sufficient to cause base current to flow in transistor 22. Once base current flows in transistor 22, transistor 11 also becomes conductive and the normal regulating process discussed heretofore is begun. Since it has been found that under certain conditions current in excess of the current through zener diode 20 is required to cause base current to flow in transistor 22, resistor 19 is provided to supply the required additional current and thereby insure starting reliability.

Protection network transistor 13 is biased into conduction and, actually, saturation once the starting voltage applied to the load is reflected across resistor 14 and the base-emitter junction of transistor 13. As noted heretofore, resistors 15 and 16 are proportioned so that, when transistor 13 is conductive, the voltage appearing at the anode electrode of diode 17 is not sufficient to cause conduction through this diode. The reverse bias and base drive used to protect regulating transistor 11 are thus "blocked" from the base electrode of this transistor by conduction through transistor 13 once base current flows in transistor 22, so that the starting sequence may proceed unimpeded. If diode 17 and transistor 13 were not provided and undervoltage protection reverse bias and current were continually applied to the base electrode of transistor 11, both the starting and regulating capabilities of the circuit would be impaired. This is apparent once it is noted that the reverse base drive and bias act to counteract the effect of the normal base drive which is used both to start and to control the regulating transistor. Since conduction of transistor 13 causes diode 17 to be nonconductive, the starting operation of the regulator is not interfered with by the reverse base drive and bias and reliable starting may thus be insured. In the same manner, the protection network also provides for automatic restarting after an undervoltage condition is removed, as discussed in detail hereinafter.

The undervoltage protection features of the present circuit are best understood by assuming that the protection network comprising diode 17 and transistor 13 is not provided and that an undervoltage condition, such as a short-circuited load 12, exists. Once the load 12 becomes short-circuited, the load voltage falls to zero, and both zener diode 24 and error-detecting transistor 22 cease to conduct. Cessation of conduction through the collector-emitter path of transistor 22 in turn reduces the emitter-base drive of regulating transistor 11 to a small value determined by resistor 19, such that the regulating transistor is conductive at a relatively small value of collector current.

Since the present regulator is unfused it would stay in this state indefinitely, i.e., regulating transistor 11 would remain relatively nonconductive until the undervoltage short-circuit condition is removed, if transistor 11 were a perfect transistor. Practically, however, transistors display an inverse collector-to-base current commonly referred to as $I_{cbo}$. Although this current is usually negligible under normal operating conditions, it rises appreciably due to increased transistor temperatures. At higher transistor temperatures due to higher emitter-collector power dissipation in the transistor, which may be caused by an undervoltage condition or higher environment temperatures, the $I_{cbo}$ current is quite large and is equivalent to extra base drive current in the transistor. In other words, the transistor temperatures cause the emitter-collector current of the transistor to increase proportionally at a rate $\beta I_b$, where $\beta$ is the direct-current gain of the transistor and $I_b$ is the sum of the normal and temperature stimulated base currents or base drive. The increased emitter-collector current increases the amount of power dissipated in the transistor and causes the temperature of the transistor to rise still higher, further increasing the $I_{cbo}$ which, in turn, causes more emitter-collector current to flow, and so on, until the transistor finally destroys itself in typical thermal runaway fashion.

Thermal runaway is prevented in the present invention by providing a reverse base drive current sufficient to cancel the effects of $\beta I_{cbo}$ regenerative multiplication at any given temperature when an undervoltage condition exists. When applied, the reverse current cancels the $\beta$ multiplication effects of the $I_{cbo}$ and permits the regulating transistor, and hence the circuit, to withstand extended undervoltage conditions. Since the reverse bias is applied only during an undervoltage condition, the normal starting, restarting, and regulating properties of the circuit are not impaired. Once again, it should be remembered that the circuit, although protected, is unfused and that the restarting is automatic without the need for manual attendance of any kind.

In the present circuit, once an undervoltage condition exists, the voltage across the shunt path comprising resistor 14 and the base-emitter junction of transistor 13 falls toward, or to, zero and causes transistor 13 to be biased out of conduction. Once transistor 13 ceases to conduct, diode 17 is biased into conduction, and current flows from the output terminal of half-wave rectifier 4, through resistor 16, diode 17, and into the base of transistor 11. This current provides the reverse base drive necessary to cancel the effects of the $I_{cbo}$ in transistor 11 and, effectively, also biases transistor 11 to a safe and stable condition close to, or preferably at, cutoff. Transistor 11 is thus protected against thermal runaway for the duration of the undervoltage condition.

Once the load undervoltage condition disappears, the regulator is automatically restarted in the manner discussed heretofore in connection with the starting sequence. It should be noted that the restarting is automatic without the need for manual attention of an operator or elaborate and expensive electro-mechanical circuitry.

In summary, an extra bias potential is provided in an unfused regulator circuit to supply an inverse base drive to the regulating transistor to automatically and indefinitely cancel the effect of the temperature stimulated base currents ($I_{cbo}$) due to an undervoltage condition. The inverse base drive is removed during starting and normal operating conditions. As noted, the application and removal of the inverse base drive is completely automatic without the need for manual attendance or electro-mechanical circuitry of any kind.

The above-described arrangement is illustrative of the principles of the invention. Other embodiments may be devised by those skilled in the art without departing from the spirit and scope of the invention.

What is claimed is:

1. A regulator circuit comprising first and second transistors, each having base, collector, and emitter electrodes, a source of input potential, a load, means serially connecting the emitter-collector path of said first transistor between said source of input potential and said load to regulate current flow from said source to said load, means responsive to load voltage variations connected to the base-emitter path of said second transistors to control the bias thereof, means connecting the collector-emitter path of said second transistor to the emitter-base path of said first transistor to vary the impedance of said first transistor in accordance with load voltage variations, a source of auxiliary potential, first switching means responsive to load voltages below a predetermined value, second switching means responsive to said first switching means, said second switching means being nonconductive when said first switching means is conductive, means connecting said first switching means to said load and to said second switching means, and means connecting said second switching means between said source of auxiliary potential and the base electrode of said first transistor to apply the potential of said auxiliary source to the emitter-base junction of said regulating transistor whenever said load voltage falls below said predetermined value to render said first switching means nonconductive and to isolate said auxiliary source from said regulating transistor whenever said load voltage is above said predetermined value to render said first switching means conductive.

2. A regulator in accordance with claim 1 wherein said first switching means is a third transistor having base, collector, and emitter electrodes and said second switching means is a diode, and which includes means connecting the base-emitter path of said first transistor across said load, means connecting the collector-emitter path of said first transistor between said source of auxiliary potential and said source of input potential, and means connecting said diode from said auxiliary source to the base electrode of said first transistor so that the forward threshold voltage of said diode is exceeded when said third transistor is nonconductive.

3. A regulator circuit comprising first, second, and third transistors, each having base, collector, and emitter electrodes, a source of input potential, a load, means serially connecting the emitter-collector path of said first transistor between said source of input potential and said load to regulate current flow from said source to said load, means responsive to load voltage variations connected to the base-emitter path of said second transistor to control the bias thereof, means connecting the collector-emitter path of said second transistor to the emitter-base path of said first transistor to vary the impedance of said first transistor in accordance with load voltage variations, a source of auxiliary potential, a diode, means connecting the base-emitter path of said third transistor across said load so that said third transistor is conductive whenever said load voltage is above a predetermined value, means connecting the collector-emitter path of said third transistor between said source of auxiliary potential and said source of input potential, and means connecting said diode between said source of auxiliary potential and the base electrode of said first transistor so that said source of auxiliary potential is connected to the base electrode of said first transistor whenever said third transistor is nonconductive due to said load voltage falling below said predetermined value.

4. A regulator comprising first, second, and third transistors, each having base, collector, and emitter electrodes, a source of input potential, a load, means serially connecting the emitter-collector path of said first transistor between said source of input potential and said load to regulate the current flow from said source to said load, means responsive to load voltage variations connected to the base-emitter path of said second transistor to control the bias thereof, means connecting the collector-emitter path of said second transistor to the base-emitter path of said first transistor to vary the impedance of the emitter-collector path of said first transistor in accordance with load voltage variations, a diode, first and second resistors, a source of auxiliary potential, means connecting the base-emitter path of said third transistor across said load so that said third transistor is normally conductive, means serially connecting said source of auxiliary potential, said first and second resistors, and the collector-emitter path of said third transistor, and means connecting said diode between the common terminal of said first and second resistors and the base electrode of said first transistor, said first and second resistors being proportioned so that the forward bias applied to said diode is less than the threshold voltage of said diode when said third transistor is conductive, said forward bias being greater than said threshold voltage when said third transistor is nonconductive so that said diode is conductive to apply the potential of the auxiliary source to the base electrode of said first transistor when said third transistor ceases to conduct due to a load undervoltage condition.

References Cited

UNITED STATES PATENTS

| 3,086,163 | 4/1963 | Francois | 323—22 |
| 3,223,915 | 12/1965 | Ryerson | 321—18 |
| 3,234,453 | 2/1966 | Klees | 323—22 |

JOHN F. COUCH, *Primary Examiner.*

K. D. MOORE, W. H. BEHA, *Assistant Examiners.*